United States Patent
Long et al.

(10) Patent No.: US 11,075,891 B1
(45) Date of Patent: Jul. 27, 2021

(54) NON-FUNGIBLE TOKEN (NFT) BASED DIGITAL RIGHTS MANAGEMENT IN A DECENTRALIZED DATA DELIVERY NETWORK

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

( * ) Notice: Subject to any disclaimer, the term of this patent is extended or adjusted under 35 U.S.C. 154(b) by 0 days.

(21) Appl. No.: 17/218,245

(22) Filed: Mar. 31, 2021

Related U.S. Application Data

(60) Provisional application No. 63/120,218, filed on Dec. 2, 2020.

(51) Int. Cl.
| | |
|---|---|
| *H04L 29/06* | (2006.01) |
| *G06F 21/10* | (2013.01) |
| *H04L 9/32* | (2006.01) |

(52) U.S. Cl.
CPC .......... *H04L 63/0457* (2013.01); *G06F 21/10* (2013.01); *H04L 9/3213* (2013.01); *H04L 9/3239* (2013.01); *G06F 2221/0788* (2013.01); *H04L 2209/38* (2013.01)

(58) Field of Classification Search
CPC . H04L 63/0457; H04L 9/3213; H04L 9/3239; G06F 21/10
See application file for complete search history.

(56) References Cited

U.S. PATENT DOCUMENTS

| | | | |
|---|---|---|---|
| 7,711,647 B2 | 5/2010 | Gunaseelan et al. | |
| 2017/0116693 A1* | 4/2017 | Rae | H04L 9/3236 |
| 2017/0221029 A1* | 8/2017 | Lund | H04W 12/04 |

(Continued)

FOREIGN PATENT DOCUMENTS

| | | |
|---|---|---|
| WO | 2019204158 A1 | 10/2019 |
| WO | 2020180754 A1 | 9/2020 |

OTHER PUBLICATIONS

Koushik B. Muthe et al, A Blockchain Based Decentralized Computing and NFT Infrastructure For Game Networks, IEEE (Year: 2020).*

*Primary Examiner* — Shanto Abedin
(74) *Attorney, Agent, or Firm* — American Patent Agency PC; Daniar Hussain; Xiaomeng Shi

(57) ABSTRACT

Methods and systems are described for implementing decentralized digital rights management (DRM) within a decentralized network, satisfying an important need of content owners. First, the method implemented by a source cacher node includes broadcasting, to one or more viewer peer nodes in the decentralized network, a notification of the source cacher node's intent to transmit a data stream. Then, recording a smart contract on a blockchain associated with the decentralized network, the smart contract associated with the data stream and allowing the authentication of a viewer peer node through the smart contract by an ownership of a non-fungible token (NFT) in order to receive a data key to decrypt the data stream. Next, receiving a request from an authenticated viewer peer node for receiving the data stream. Finally, generating an encrypted data stream based on the data stream and the data key to decrypt the data stream, and transmitting the encrypted data stream and the data key to the authenticated viewer peer node.

17 Claims, 9 Drawing Sheets

(56) References Cited

U.S. PATENT DOCUMENTS

| | | | |
|---|---|---|---|
| 2018/0096175 A1* | 4/2018 | Schmeling | G06Q 10/08 |
| 2019/0173854 A1* | 6/2019 | Beck | H04L 9/3239 |
| 2019/0299105 A1* | 10/2019 | Knight | G07F 17/3244 |
| 2020/0273048 A1* | 8/2020 | Andon | G06F 16/2379 |
| 2021/0067342 A1* | 3/2021 | Guinard | H04L 9/0643 |
| 2021/0133700 A1* | 5/2021 | Williams | G06Q 20/065 |

* cited by examiner

The Edge Node Network

300

Stream Advertisement and Discovery

Encrypted Video Stream Delivery

Incorporating the Blockchain Guardian Nodes

NON-FUNGIBLE TOKEN (NFT) BASED DIGITAL RIGHTS MANAGEMENT IN A DECENTRALIZED DATA DELIVERY NETWORK

REFERENCE TO RELATED APPLICATIONS

This application is a non-provisional of and claims the benefit of priority to provisional application U.S. Ser. No. 63/120,218, filed on 2 Dec. 2020, entitled "Decentralized Data Streaming and Delivery Network with Digital Rights Management and Associated Systems and Methods," the entire disclosure of which is hereby incorporated by reference in its entirety herein.

This application is also related to U.S. Pat. No. 10,771,524, issued on 8 Sep. 2020 (U.S. Ser. No. 16/751,772, filed on 24 Jan. 2020), entitled "Methods and Systems for a Decentralized Data Streaming and Delivery Network," which itself is a non-provisional of and claims the benefit of priority to provisional application U.S. Ser. No. 62/880,682, filed on 31 Jul. 2019, entitled "Methods and Systems for Micropayment Support to Blockchain-Incentivized, Decentralized Video Streaming and Delivery," and is also a non-provisional of and claims the benefit of priority to provisional application U.S. Ser. No. 62/914,176, filed on 11 Oct. 2019, entitled "Methods and Systems for Decentralized Data Streaming and Delivery Network" the entire disclosures of all of which are hereby incorporated by reference in their entireties herein.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of decentralized data delivery, and pertain particularly to a decentralized data streaming and delivery network with digital rights management (DRM) using Non-Fungible Tokens (NFTs).

BACKGROUND OF THE INVENTION

The statements in this section may serve as a background to help understand the invention and its application and uses, but may not constitute prior art.

Internet video accounts for over three-quarters of all Internet traffic and is growing further, and may increase to 82% by 2022, according to CISCO'S February 2019 Visual Networking Index (CISCO VNI Global IP Traffic Forecast for 2017-2022). The same report predicts that from 2017 to 2022, global Internet video traffic will grow four-fold, live Internet video will grow 15-fold, Virtual Reality and Augmented Reality traffic will grow 12-fold, and Internet gaming traffic will grow 9-fold. In the U.S., millennials between the ages of 18 and 34 are driving the growth of video streaming. Streaming video among this group has jumped 256% from an average of 1.6 hours per week to 5.7 hours per week according to a SSRS Media and Technology survey, and mobile devices are leading the charge in video consumption.

Content Delivery Networks (CDNs), which refer to systems of distributed servers that minimize delay in delivering data to users by reducing the geographical distance between servers and users, are predicted by CISCO to carry 72% of Internet traffic by 2022, and they play an important role in distributing web content and streaming video data, by providing a backbone infrastructure to deliver data streams to end users.

Decentralized data delivery networks, such as Peer-to-Peer (P2P) networks, offer faster, cheaper, and more robust data distribution than CDNs, but suffer from piracy and copyright infringement concerns. Digital rights management (DRM) for managing intellectual property (IP) rights, such as copyrights, on data networks represents a major concern for content providers as demand for digital content grows. DRM represents an especially large concern for content providers in the context of decentralized data delivery networks. Content providers are concerned about the protection of their copyrighted works in decentralized and peer-to-peer data delivery networks. It would be an advancement in the state of the art to provide a decentralized DRM solution that protects content owners' copyrighted works when distributed over decentralized networks.

It is against this background that various embodiments of the present invention were developed.

BRIEF SUMMARY OF THE INVENTION

Methods and systems are provided for a decentralized data streaming and delivery network with digital rights management (DRM) using Non-Fungible Tokens (NFTs).

In various embodiments, a computer-implemented method utilized by a source cacher node for implementing decentralized DRM within a decentralized network is described. The computer-implemented method comprises steps for broadcasting, to one or more viewer peer nodes in the decentralized network, a notification of the source cacher node's intent to transmit a data stream, where the decentralized network comprises a plurality of peer nodes connected via peer-to-peer (P2P) connections. Then, recording a smart contract on a blockchain associated with the decentralized network, the smart contract associated with the data stream, and the smart contract allowing the authentication of a viewer node through the smart contract by an ownership of a non-fungible token (NFT) in order to receive a data key to decrypt the data stream. Next, receiving a request from an authenticated viewer peer node of the one or more viewer peer nodes for receiving the data stream. Finally, generating an encrypted data stream based on the data stream and the data key to decrypt the data stream, and transmitting the encrypted data stream and the data key to decrypt the data stream to the authenticated viewer peer node.

In one embodiment, the transmission of the encrypted data stream comprises a live stream, where the transmission of the encrypted data stream is relayed through an authenticated edge cacher node. Moreover, the computer-implemented method may further include locking, via the smart contract, a reward from the authenticated viewer peer node; and releasing, via the smart contract and to the source cacher node and the authenticated edge cacher node, respective portions of the reward over a predetermined time interval. A reward may include a digital asset designed to work as a medium of exchange where ownership records are stored in a ledger existing in a form of computerized database using strong cryptography to secure transaction records, to control the creation of additional currency, and to verify the transfer of ownership. In various embodiments, the disclosed systems can trigger the smart contract on the blockchain, for example, when performing a read operation by a viewer node.

In another embodiment, the authenticated edge cacher node can determine at least a first portion of the reward from the viewer peer node and at least a second portion of the reward, where the first portion is released to the authenticated edge cacher node, and where the second portion is released to the source cacher node.

In one embodiment, the source cacher node can generate and transmit, via the blockchain, a random nonce to the viewer peer node and can receive, from the viewer peer node, a signed nonce including the viewer peer node's address, and the source cacher node can query the blockchain with the viewer peer node's address and determines, based on a result of the query, whether the viewer peer node holds the NFT as a proof of authenticity.

In another embodiment, the decentralized network can include at least one guardian node, the guardian node connected to at least the source cacher node, and where the guardian node can perform at least one computation associated with the querying of the blockchain by the source cacher node. In one embodiment, the blockchain can utilize a validator committee of mining nodes to mine new blocks in a block settlement process; and the blockchain can further utilize the at least one guardian node to validate the blockchain at checkpoint blocks, in a block finalization process, and the checkpoint blocks can include a subset of blocks in the blockchain. In another embodiment, the at least one guardian node can be within a predetermined geographical proximity of the source cacher node.

In some embodiments, at least one of the encrypted data stream and the data key to decrypt the data stream can be associated with a digital rights management protocol.

In one embodiment, the broadcasting the notification of the source cacher node's intent to transmit the data stream can further include using a publish-subscribe technique to advertise the notification to the viewer peer node, where the viewer peer node can be subscribed to notifications from the source cacher node.

In various embodiments, a non-transitory storage medium storing program code is described, where the program code is executable by a hardware processor. Further, the program code, when executed by the processor, can execute a process utilized by a source cacher node for implementing decentralized DRM within a decentralized network. The program code can include the steps of broadcasting, to one or more viewer peer nodes in the decentralized network, a notification of the source cacher node's intent to transmit a data stream, where the decentralized network comprises a plurality of peer nodes connected via peer-to-peer (P2P) connections. Then, recording a smart contract on a blockchain associated with the decentralized network, the smart contract associated with the data stream, and the smart contract allowing the authentication of a viewer peer node through the smart contract by an ownership of a non-fungible token (NFT) in order to receive a data key to decrypt the data stream. Next, receiving a request from an authenticated viewer peer node of the one or more viewer peer nodes for receiving the data stream. Finally, generating an encrypted data stream based on the data stream and the data key to decrypt the data stream, and transmitting the encrypted data stream and the data key to decrypt the data stream to the viewer peer node.

In various embodiments, a system including a hardware processor and a non-transitory storage medium storing program code is described. The program code can be executable by the hardware processor. Further, the program code when executed by the processor can execute a process utilized by a source cacher node for implementing decentralized DRM within a decentralized network. The program code may include the steps of broadcasting, to one or more viewer peer nodes in the decentralized network, a notification of the source cacher node's intent to transmit a data stream, where the decentralized network comprises a plurality of peer nodes connected via peer-to-peer (P2P) connections. Then, recording a smart contract on a blockchain associated with the decentralized network, the smart contract associated with the data stream, and the smart contract allowing the authentication of a viewer peer node through the smart contract by an ownership of a non-fungible token (NFT) in order to receive a data key to decrypt the data stream. Next, receiving, a request from an authenticated viewer peer node of the one or more viewer peer nodes for receiving the data stream. Finally, generating an encrypted data stream based on the data stream and the data key to decrypt the data stream, and transmitting the encrypted data stream and the data key to decrypt the data stream to the viewer peer node.

Other embodiments include non-transitory storage media, which store program code executable by a hardware processor, for implementing the methods and processes described herein. Yet other embodiments include systems comprising a hardware processor and a non-transitory storage medium. The non-transitory storage medium store program code that are executable by a hardware processor for implementing the methods and processes described herein.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Figure 1:
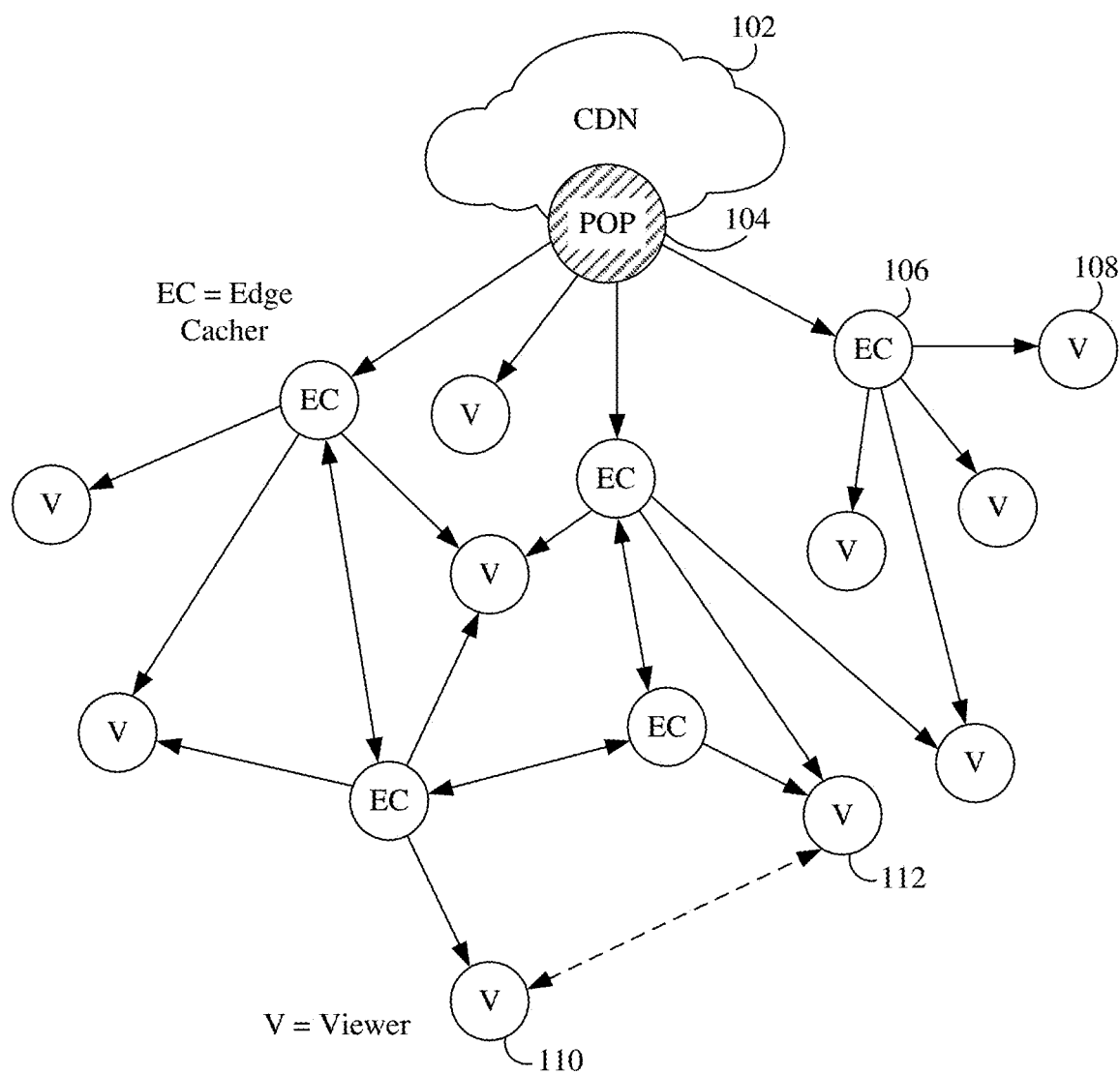
FIG. 1 is a network diagram illustrating a hybrid network architecture combining peer-to-peer networking with a traditional CDN, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark names may be interchangeably used in the specification and drawing to refer to the products/services offered by embodiments of the present invention. The term THETA may be used in this specification to describe the overall decentralized data streaming and delivery network or platform, the public ledger system for payment of bandwidth use or content streaming, as well as the company providing said network, platform, system, or service. With reference to the figures, embodiments of the present invention are now described in detail.

Overview

Broadly, embodiments of the present invention relate to methods and systems for data content distribution with digital rights management (DRM) over a network. In some embodiments, the network can include a decentralized data-delivery network (hereinafter, the "THETA network" or "THETA data delivery network"), where peer-to-peer (P2P) data exchanges are facilitated. In some embodiments, the decentralized data-delivery network has a hybrid structure with a content delivery infrastructure backbone. Digital data content distributed over the THETA network may include, for example, live multi-media streams, video-on-demand, binary large objects, encrypted data, text data, audio, software updates, ads, large static data files, combinations thereof, and the like. In some embodiments, the data exchanges can be facilitated through the use of tracker servers, cachers, viewer client-side intelligence, and blockchain-based micropayment incentives and rewards for resource sharing, to be discussed further herein.

Content distributed via decentralized, P2P sharing protocols can face content piracy issues. Content providers may generally desire to protect their content rights while distributing the content over a P2P protocol like the THETA Network. In some embodiments, the THETA Network can be configured to permit a video platform to determine which content to host, such that DRM use is not required but the protocol used can be configured to offer the option of DRM use. Some DRM techniques can include encryption, scrambling of expressive material, and embedding of a tag, which is designed to control access and reproduction of information, including backup copies for personal use. DRM technologies can enable content publishers to enforce their own access policies on content, such as restrictions on copying or viewing.

Further, as noted, in some embodiments, the disclosed systems describe a P2P decentralized network that can be integrated with DRM. As used herein, "digital rights management" and "DRM" refer to a set of access control technologies for restricting the use of digital content, such as copyrighted works. In some aspects, DRM can be used to control the use, modification, and/or distribution of copyrighted works (such as software and multimedia content), and can include systems within devices (e.g., mobile phone, laptop, smart television, etc.) that enforce these policies. In some aspects, in some DRM systems, a DRM server may be needed to verify that a particular user is subscribed to a requested stream. Thereafter, if the DRM server determines that the user is subscribed, the DRM server can issue a decryption key to the user such that the user's device (e.g., mobile phone, laptop, television, etc.) can use the decryption key to decrypt the encrypted stream received over the network.

In one embodiment, an "encryption key", "data key", or "key" may refer to a piece of data or information used for an encryption/decryption algorithm. A data key may be a unique piece of data and is typically part of a key pair where a first key (e.g., an encryption key) may be used to encrypt data, while a second key (e.g., a decryption key) may be used to decrypt the encrypted data. In some embodiments, the encryption is symmetric, and the encryption and decryption keys are identical. The encryption/decryption key may be a numeric or alphanumeric value and may be generated using an algorithm, such as a pseudorandom-number generator based algorithm or other means.

As used herein, the term "data key" represents a key that can be used to decrypt a data stream received from a peer node in a decentralized data delivery network. In other aspects, the disclosed systems may use a "transaction key" that can include key pairs (e.g., public/private key pairs for blockchain-based transactional operations). Accordingly, the disclosed systems may use two different keys, a transaction key which can be used for blockchain transactions and another data key, which can be used for encrypting and decrypting a data stream between nodes.

Various embodiments of the present invention are applicable, but not limited to, decentralized peer-to-peer content delivery systems and platforms, which can enable the timely delivery of content under relatively strict, near real-time parameters. Peer nodes of the decentralized network may function as end users as well as serving as caching relays that source content to nearby peer nodes. Further, such peer nodes may connect to a central content server when no close-by peer sources are available. To incentivize end users to join as caching nodes for sharing redundant bandwidth and storage resources, and to encourage more active engagement with content platforms and content creators, a decentralized public ledger system (hereinafter, the "THETA blockchain ledger system" or the "THETA blockchain") may be utilized in combination with the decentralized data delivery network to reward or compensate for caching and relaying data content to peer users at very fine granularities while offloading content distribution costs. Generally, a peer node may include a computing device associated with the decentralized network. A node may be associated with and/or operated by a server computer or any suitable device on the network. Each node may have particular rights and restrictions associated with the node.

More specifically, in the present disclosure, "viewer" nodes of the decentralized network refer to general end-user clients that consume delivered data, including content of various file types, such as live multi-media streams, video-on-demand, binary large objects, encrypted data, text data, audio, software updates, ads, large static data files, and the like. As used herein, "viewers" and video streaming are discussed in exemplary embodiments, for illustrative purpose only, without limiting the scope of the methods, systems, and devices as disclosed herein, which are capable of delivering and/or consuming various data content types with various reliability and latency requirements. Correspondingly, a given network node is configured to support the different requirements of various content types, such as the requirements of a live stream, Video-on-Demand (VoD), and other data types. Moreover, in a unified view of the data delivered within the network, different types of content may be generally considered as data files or data streams. A given caching node may store chunks, fragments, or slices of a data file or data stream, and may support "range requests" to avoid the need to download a large chunk of the file when only a small fraction is needed. For example, a CDN server or caching node may serve data contents as data blobs and/or chunks, while also supporting byte-range requests.

In some network topologies, individual nodes may be connected to a CDN server directly via a point-of-presence (POP) data center. On the other hand, nodes within a P2P network may share data directly with each other, without the need of a central server. That is, each peer node within a P2P network may serve as both a server/cacher or client.

P2P streaming may be used for timely delivery of audio and video content under strict, near real-time parameters. P2P livestream delivery may work in a more optimal manner when many users join the network in order to tune in for the same stream at substantially the same time. In this manner, high concurrent user count can lead to more peer resources being available on the network; thus, peer nodes can obtain data streams from each other more efficiently as compared with a situation where the stream is not viewed by many users at a given time. Accordingly, overall system capacity increases as more peer nodes become available on the decentralized network. Moreover, robustness of the system can be greater in a P2P network when compared to CDNs, as nodes of the P2P network do not necessarily need to rely on a centralized server to retrieve content. This lack of dependence on a centralized node can lead to increased robustness of the decentralized network in cases of server failure. In contrast, for centralized CDN-based delivery, a relatively high number of concurrent users can place scalability pressures on the CDN servers, which can reduce the efficiency and/or robustness of the corresponding network. Thus, a P2P network actually becomes more robust as more users join the network.

In various embodiments, the disclosed systems may use and be integrated with a blockchain. In particular, the disclosed systems may use a form of decentralized ledgers and cryptographically-generated tokens, such as non-fungible tokens (NFTs), to verify that a given user (corresponding to a given node on the decentralized network) has been given access to a particular content and/or has purchased or rented a given content, for example, for the purposes of streaming. Thus, the disclosed systems can, based on the verification, perform a data key distribution over the decentralized peer-to-peer content-distribution network. By implementing such a technique, the disclosed systems can reduce or eliminate the need for a central data key server for DRM. Therefore, the disclosed systems may serve as a form of decentralized DRM.

A "non-fungible token" or "NFT" is a cryptographic asset, cryptographic token, or digital ledger object that is recorded on a blockchain. NFTs are indivisible, and not mutually interchangeable. A given NFT has its own unique information, attributes, or characteristics, such as permanent, unalterable metadata that describes or defines its authenticity. An NFT is transferrable in terms of ownership. In contrast, other "fungible" cryptocurrencies, such as Bitcoin, are identical to each other and can be traded or exchanged as identical units and are usually infinitely subdividable. However, NFTs are unique and non-subdividable. They may function as unique certificates of authenticity, making them suitable for use to commodify or "tokenize" digital assets, such as copyrighted works. Thus, NFTs can be used in connection with the various described embodiments of the present disclosure because of the NFT's ability to function as a proof of ownership, for example, in authenticating ownership of copyrights, digital assets, and digital and real-world identities, combinations thereof, and the like.

In various embodiments, the disclosed systems can use the NFTs for a variety of other uses and/or applications in addition to verifying the node's authorization to access content as described above. For example, the NFTs can be associated with virtual assets including, but not limited to, virtual pets, virtual celebrities, virtual contacts, combinations thereof, and the like. In another embodiment, the disclosed systems can be configured to determine, assign, reassign, and/or use tokenized virtual assets using the DRM. In one embodiment, the disclosed systems can use the tokenized virtual assets using DRM to confer a temporal ownership (e.g., a subscription) to the virtual assets. In another embodiment, the disclosed systems can be configured to use the tokenized virtual assets using DRM to provide and/or exchange virtual tickets (e.g., virtual concert tickets, virtual ballgame tickets, etc.) between users.

In some aspects, NFTs can be used to exchange crypto art; similarly, the disclosed systems can use an NTF to represent eligibility/authorization to receive/transmit streaming data that are tradable from one owner to another (e.g., one node to another). NFTs for crypto art can transfer between owners while the art itself resides on a server; accordingly, the token can be used to prove ownership, while the location of the crypto art does not change. However, here the video on demand and/or the live streaming aspect of the data being transferred is changing location from one node of the network to another (e.g., source cacher node to peer viewer node). Further, for video-on-demand or streaming applications, the streamed data is transferred in fractional units, while in the crypto art case, the transfer of data (e.g., in the case in which it is moved from one node/server to another) is not fractional but rather in whole units (e.g., the entire crypto art piece). Further, in the disclosed embodiments, the disclosed systems can transfer streaming data from one node to many nodes (e.g., in a broadcast or multicast of a movie or other content). Further, in some aspects, the streaming can last for a certain period of time (e.g., it can be a temporary subscription, not a permanent one).

In various embodiments, the disclosed systems can include an NFT representing a ticket to an event, such as an online concert ticket. Accordingly, nodes that have the NFT can be permitted to access the data stream. In other words, the disclosed systems can use the infrastructure provided by the decentralized blockchain for data streaming. Alternatively or additionally, the disclosed systems can use existing infrastructure, including centralized content distribution servers, and can present credentials (e.g., NFT or a credential determined or derived based on the NFT) to present to the server for authorization to receive the streaming data (e.g., live concert data).

In some aspects, as compared with a central server having a DRM capability, the disclosed system may have several distinct advantages. In particular, the disclosed systems may feature a blockchain as part of the authorization infrastructure, which affords decentralization, immutability, security, and transparency. Further, users of the disclosed systems may use NFTs for authorization in the manner described herein, and may further trade NFTs such that other users on different nodes can be authorized to send and receive streaming data as described herein, since NFTs can be used to transfer the ownership for the streaming authorization. In some aspects, source cacher nodes can be configured to operate purely via a peer-to-peer (P2P) network (e.g., a fully distributed, decentralized data delivery network) or can include a centralized server (e.g., a content delivery network (CDN) server), or can be in a hybrid mode (e.g., a P2P network having some nodes connected to one or more CDN servers, and having communication with both a P2P network and with a centralized network). In various aspects, users can use the disclosed systems to stream content from various content providers (e.g., filming studios, online content makers, other user-generated content from other nodes on the network, etc.), and/or watch stream live content (e.g., sports games, pay per view content, news broadcasts, combinations thereof, and the like). Accordingly, in some aspects, the disclosed embodiments describe a method by which the disclosed systems can serve to integrate industry-standard DRM into the THETA protocol, thereby ensuring that the content from the content providers is distributed over the THETA network but is not pirated. (Pirated content may include copyrighted content, such as music or software, that is distributed digitally without permission, something highly disadvantageous to owners of digital content.)

In some embodiments, existing DRM services may be integrated to the THETA protocol, thereby allowing video platforms to enable video relaying while ensuring only legitimate users can decrypt video segments of specified licensed content. Accordingly, the disclosed systems can permit a THETA content partner (e.g., a given node on the network) to deliver live and on-demand content encrypted dynamically. In some embodiments, the content can be encrypted using any suitable protocol, including, but not limited to, an Advanced Encryption Standard (AES-128). In another embodiment, the disclosed systems and the associated THETA DRM platform can be configured to deliver AES keys and DRM licenses to authorized users as described further herein. In another embodiment, the disclosed systems can integrate a THETA peer-to-peer delivery library with a DRM system since the THETA network is content agnostic.

In some embodiments, content (e.g., copyrighted movies) that are distributed via the disclosed systems and associated networks can be securely shared among the various nodes of the network and the DRM can be managed accordingly, such that the content is not intelligible to nodes that do not have permission to view the content and not diverted to illicit file sharing platforms.

In other embodiments, the disclosed systems can further find applications in live sports streaming. In particular, nodes associated with rights holders (e.g., users that hold rights allowing for the viewing and distribution of content) may not desire to use a video distribution network that allows other nodes associated with other users to pirate the streaming content and thereby reduce their customer base. Accordingly, the disclosed systems featuring DRM distribution of content via the THETA protocol as variously described herein can permit one or more nodes associated with a content owner to only allow node(s) associated with their actual customers to view such content.

While the blockchain is featured primarily in the disclosure, it is to be understood that the systems and methods described herein are not limited to blockchain but can be used in connection with any suitable distributed ledger technology. Such a distributed ledger technology can include a consensus of replicated, shared, and synchronized digital data geographically spread across multiple sites, countries, or institutions.

In another example, the disclosed systems can find application in game services. For example, nodes associated with a game service can use the disclosed systems including the THETA protocol to deliver games or updates/patches to other nodes associated with its users. Further, the game service can be assured that only nodes associated with customers who own the game are allowed to download it over THETA Network via the disclosed systems and methods.

In various embodiments, the disclosed systems can permit one or more nodes associated with users that view content to earn rewards or incentives in cryptocurrency. In another embodiment, one or more nodes associated with a given user can be rewarded to participate in the decentralized network (e.g., to relay content, share excess bandwidth and resources, etc. to other authorized viewing nodes). In some aspects, the disclosed systems can lead to a higher quality, smoother video streaming via a decentralized P2P network that can stream efficiently globally and securely among the nodes of the network. Further, the disclosed systems may enable a reduced cost of delivering content based on the fact that video platforms may no longer need to build relatively expensive infrastructure due to the decentralized P2P distribution of the content that is simultaneously secured via the DRM distribution mechanism described herein.

Decentralized Hybrid Network for Data Streaming and Delivery

In a traditional content distributing network (CDN), individual nodes are connected to a CDN server directly via a Point-of-Presence (POP) data center. On the other hand, nodes within a peer-to-peer (P2P) network share data directly with each other, without the need of a central server. That is, each peer node within a P2P network may be both a server/cacher or a client.

Peer-to-peer (P2P) streaming often focuses on timely delivery of audio and video content under strict, near real-time parameters. P2P livestream delivery works best when many people tune in for the same stream at the same time. High concurrent user count means more peering resources are available, and thus peer nodes can pull data streams from each other more efficiently. Overall system capacity increases as more peer nodes become available. Moreover, robustness of the system is increased in a P2P network when compared to traditional CDNs, as nodes do not need to rely on a centralized server to retrieve content. This is especially important in cases of server failure. In contrast, for centralized CDN-based delivery, a high number of concurrent users places scalability pressures on the CDN servers instead.

One shortcoming of pure P2P streaming is availability. Peers come and go at any time, which makes it difficult to predict the availability of any given peer node. There are also inherent differences and asymmetries in nodes, such as upload and download capacities. On the other hand, a CDN server is more reliable and robust, and hence it can serve as a reliable "backup" when requested data is not available from peer nodes.

Taking advantage of both P2P networks and a CDN network, FIG. 1 shows a network diagram 100 of a decentralized data delivery "hybrid network" combining the two, according to one embodiment of the present invention. Within this hybrid data delivery network 100, peer-to-peer connections among viewers ("V") 108 and edge cachers ("EC") 106 operate on top of an existing CDN 102, which itself comprises one or more point of presence ("POP") servers 104. In the present disclosure, a "viewer" is a network node, end user, or client that consumes delivered data, while an "edge cacher" or "cacher" is a dedicated, intermediate relay node that caches and/or relays data to neighboring peer nodes. Although individual nodes are labeled as either a viewer or an edge cacher in FIG. 1, a node may function both as a viewer and an edge cacher simultaneously. For example, the dashed line between viewers 110 and 112 on the edge of the network represents a data link over which each of nodes 110 and 112 may transmit cached data to the other.

Hybrid mesh streaming utilizes both P2P nodes ("V" and "EC") and one or more CDN servers for data delivery, and thus combines the advantages of both; namely, high scalability of the P2P infrastructure along with the high availability of the CDN delivery backbone. One goal of this hybrid system is to achieve maximum CDN bandwidth reduction without sacrificing quality-of-service (QoS) critical to established streaming platforms such as NETFLIX, YOUTUBE, TWITCH, FACEBOOK and others. In a traditional CDN, every node pulls data streams directly from the POP server. In the hybrid network 100, whenever possible, peer nodes may pull data from each, other instead of from the POP server. That is, only a subset of nodes pull data streams from the POP server; other nodes simply pull data streams from their peer caching nodes, which provide better and more efficient connections. Caching nodes thus augment the traditional CDN backbones with more caching layers for end viewers geographically far away from POPs of the CDN backbones. This hybrid architecture applies to both video on demand and live streaming scenarios, as well as other data streaming and delivery setups.

Figure 2:
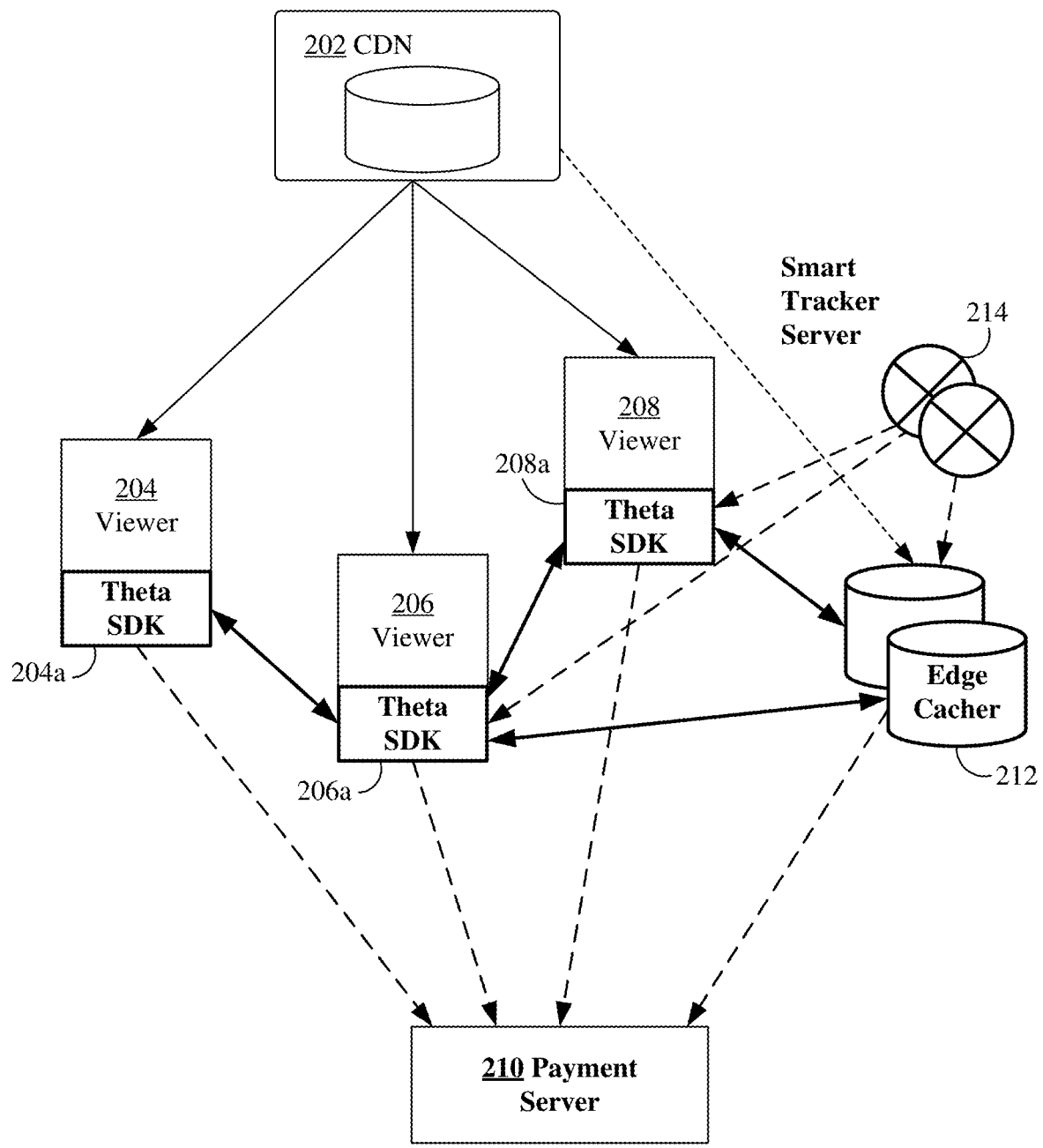
FIG. 2 is an illustrative network diagram showing a decentralized data streaming and delivery hybrid network with smart tracker servers and a payment server, according to one embodiment of the present invention.

More specifically, FIG. 2 is an illustrative network diagram showing a decentralized, hybrid network 200, according to one embodiment of the present invention. In this illustrative example, hybrid network 200 comprises a CDN server or backbone 202, viewer nodes 204, 206 and 208, edge cacher 212, smart trackers 214, and an optional payment server 210. Viewers 204, 206, and 208, and edge cacher 212 are each connected directly to CDN 202, possibly through a POP server (not shown); viewers 204 and 206 are directly connected; viewers 206 and 208 are also directly connected, and both linked to edge cacher 212. In this hybrid structure, a viewer node may attempt to pull data from peers first, and only resort to downloading from CDN 202 as a failure-proof backup. In addition to dedicated edge cacher 212, each viewer may serve as a cacher node as well.

Hybrid network 200 is designed to operate either independently, or on top of an existing CDN, which provides content to a plurality of peer nodes such as 204, 206, and 208. Although only one CDN server 202 is shown for simplicity, hybrid network 200 can operate with multiple CDN servers. Hybrid network 200 may also operate independently of CDN server 202 when sufficient number of peer nodes are operating within the network.

In various embodiments, hybrid network 200 supports the transmission of various types of data content and files such as, but not limited to, live stream multimedia data, video-on-demand (VoD), large static data files, e.g., data blobs, system updates, game patches, advertisements, etc. In some embodiments, different types of data content may all be viewed as data files, with each file divided into small segments, chunks, fragments, or slices. In this disclosure, a file "fragment" refers to a section, portion, or fraction of a data file, and may have different granularities or resolutions in different embodiments. A data file fragment may be further divided into smaller slices, possibly on a byte-wise scale. Hybrid network 200 may store file fragments or slices instead of entire files in all or a subset of its constituent peer nodes. Live streams may be viewed as files being generated and streamed at the same time. In one example, the viewers and edge cachers can support Web RTC (Real-Time Communications) HTTP/HTTPS protocols.

Accordingly, peer nodes 204, 206, and 208 may include different types of viewer and/or edge cacher clients capable of processing different data content types. Although FIG. 2 shows edge cacher 212 as separated from viewer nodes 204, 206, and 208, one or more of peer nodes 204, 206 and 208 may simultaneously implement an edge cacher as well as an end user software using a THETA Software Development Kit (SDK) such as 204a, 206a and 208a, so that a viewer may store and distribute content via P2P connections while also consuming the content. Unlike some streaming services that require proprietary content viewers such as video players to be installed, the THETA SDK may be integrated into a third-party application or device so that data content accessed by a peer node may be viewed or played within the third-party application. A Software Development Kit (SDK) is a set of software development tools or programming packages for creating applications for a specific platform. An SDK may be compiled as part of the developed application to provide dedicated interfaces and functionalities. Alternatively, an SDK may be an individually compiled module, incorporable into an existing application or player as a plug-in, add-on, or extension in order to add specific features to the application without accessing its source code.

In various embodiments, peer nodes 204, 206, and 208 may each implement different types of client software that enable different functionalities. A peer node 212 which implements an edge cacher may store fragments of the content, or slices within the fragments, to be delivered. The slices may be transmitted to requesting peers as needed. A peer node functioning as an edge cacher 212 may be viewed as having two local cache layers, a memory and a hard drive.

Such a peer node 212 may implement a unified cache lookup strategy, where the memory is first accessed, and a hard drive may then be accessed for retrieving the requested content. However, it may be noted that some clients may not have hard drive storage (such as a mobile phone), in which case edge cacher 212 may be implemented as a single local cache. Therefore, an abstracted cache interface may be enabled so that devices with or without hard drives can act as edge cacher nodes within hybrid network 200. Such nodes may be used to share live streams and concurrent VoD which are stored in memory. In the case of patch updates, a hard drive is typically required as the patch updates are stored on the hard drive.

The various content types supported by hybrid network 200 may have different delay or latency requirements. For example, livestreams require real-time or near real-time delivery, while VoD may require real-time delivery for the portion that a user is currently watching. Data blobs may not require real-time support, but download time needs to be minimized nonetheless. In order to support the relaying or propagation of large files, a "range request," where a content fragment may be further divided into smaller slices and only a slice is requested and sent, may be supported in hybrid network 200. For example, CDN server 202 may support a range request while also able to provide a data blob as a complete large file.

Hybrid network 200 additionally may include one or more optional smart tracker servers 214 for guiding edge cacher nodes (viewers, edge cachers) to self-organize into a semi-randomly connected network based on network distance and/or geo-locations, and to provide intelligence to edge cacher nodes to store and distribute data content among peers of the network. Smart trackers 214 may assist in peer discovery, provide guidance to edge cacher 212 in storing and delivering data, and may handle an unbounded number of live streams, VoD data, or data blobs concurrently. Smart trackers 214 or tracker server (e.g., a separate device configured to perform server functionality) may handle a relatively large number or an unbounded number of data streams or blobs effectively, for example, by having a suitable architecture (e.g., a micro-service based architecture) and/or a computational capacity beyond a given threshold. The tracker server function may be implemented with a micro-service architecture including, but not limited to, one or more of a signaling service, a grouping service, a stats service, an authenticity service, and a private API service.

Guided by smart trackers 214 or through other appropriate peer discovery mechanisms, cacher nodes (edge cachers and viewers) may self-organize into semi-randomly connected networks based on network distance or their geolocations. In one example, physical distances may be estimated and nodes within a certain threshold distance may be selected for P2P data sharing. In some embodiments, cacher nodes are not partitioned into clusters to simplify backend design and to improve robustness of the network. The network therefore continues to function if any cacher node leaves the network, so that even if only one viewer node remains, this viewer node can still pull data directly from CDN 202. As more cacher nodes are added to the network, the network becomes more efficient and achieves higher CDN offload.

Furthermore, peer nodes shown in FIG. 2 may be communicatively coupled to an optional payment server 210 which facilitates and manages payment transactions among viewers 204, 206, and 208 and edge cacher 212 when data contents are distributed. One or more instances of the payment server 210 may be implemented in hybrid network 200, as a dedicated network node, or physically co-located with another network node, such as CDN server 202, smart trackers 214, or any peer node within hybrid network 200. For example, the payment server 210 may be co-located with smart tracker 214, where each is implemented as a software module. While smart tracker 214 determines P2P connections among peer nodes based on factors such as geographical distances and resource availabilities, it may also determine payment authorization groups, where only members of a group may exchange payments for participating in P2P content distributions. In various embodiments, the payment server 210 may be implemented as a stand-alone payment service software module, or as part of the THETA SDK. In the exemplary embodiment shown in FIG. 2, peer nodes 204, 206, 208, and 212 are each individually connected to payment server 210. Additionally, in some embodiments, the payment server 210 may be provided by a third-party, different from source CDN 202 as owned by a content distribution platform; in yet some embodiments, a content distribution platform may run payment server 210 itself.

In some embodiments, when two edge cachers exchange data, tit-for-tat compensation via traditional means (e.g., off-chain settlements between trusted parties) may be used, and no cryptocurrency payment is involved. On the other hand, trustless viewer nodes 204, 206, and 208 may pay edge cachers 212 micropayments through a resource-orientated micropayment pool, disclosed in co-pending application U.S. Ser. No. 16/726,148, filed on 23 Dec. 2019, entitled "Methods and Systems for Micropayment Support to Blockchain Incentivized, Decentralized Data Streaming and Delivery," incorporated by reference herein.

In short, the THETA hybrid network combines the advantages of P2P and CDN techniques to achieve high scalability and high resource availability and attains at least the following characteristics: the THETA hybrid network can be self-organizing, self-adaptive, self-evolving, featuring reduced or minimal operational overhead, and highly available and robust. The THETA hybrid network can feature a plug and play architecture whereby a network node can join or leave at any time. Further, the THETA hybrid network can serve to support the delivery of various types of content (e.g., livestream, video on demand (VoD), data blob, etc.) within a unified data retrieval framework. In another embodiment, the THETA hybrid network can be highly secure, be Digital Rights Management (DRM) compatible, and be General Data Protection Regulation (GDPR) compatible.

Further details of the THETA decentralized data streaming and delivery network architecture is provided in related U.S. Pat. No. 10,771,524, issued on 8 Sep. 2020 (U.S. Ser. No. 16/751,772, filed on 24 Jan. 2020), entitled "Methods and Systems For a Decentralized Data Streaming and Delivery Network," the entire disclosure of which is hereby incorporated by reference in its entirety herein.

THETA Blockchain-Based Ledger System with Digital Rights Management (DRM)

While FIGS. 1 and 2 provide architectural details of a THETA data delivery network having a hybrid architecture, in what follows, a more global, fully decentralized network is presented for clarity, with the digital rights management-enabled THETA blockchain-based ledger system discussed in detail.

Figure 3:
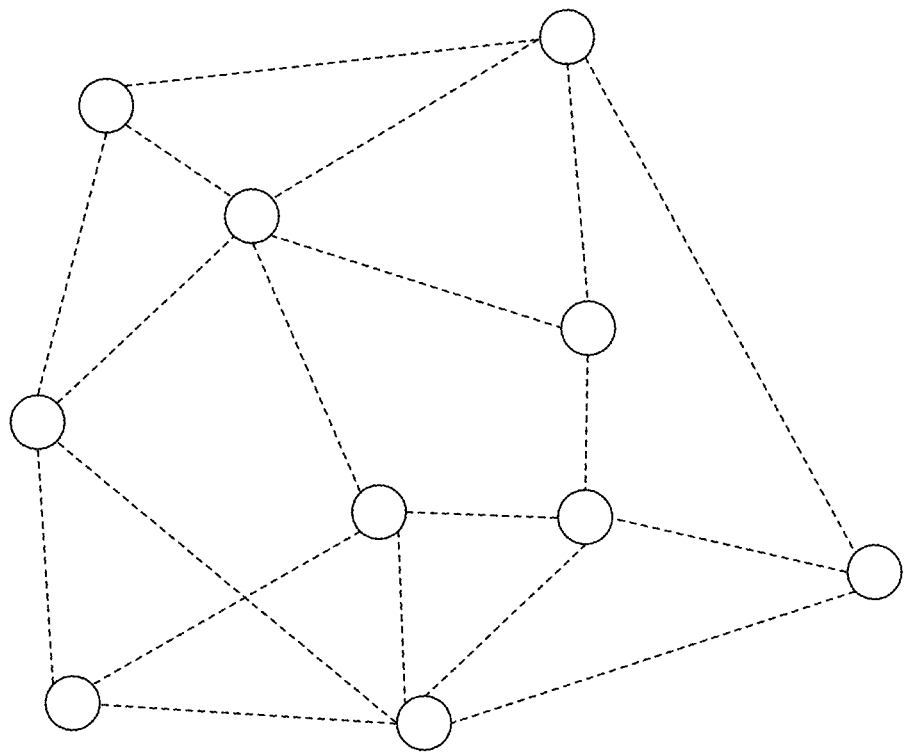
FIG. 3 shows a diagram for at least a portion of a distributed content delivery network, in accordance with example embodiments of the disclosure.
Figure 3:
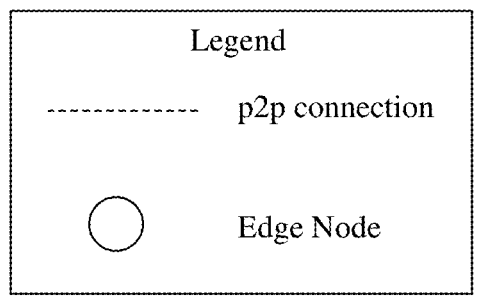

While the distributed hybrid data delivery network presented in the previous section for data streaming and delivery provides one context for blockchain-enabled digital rights management (DRM), in what follows, additional details and further embodiments are provided with reference to a more general mesh network. It would be understood by persons of ordinary skill in the art that the various embodiments of methods and systems as described herein apply to any decentralized network, including a hybrid network, a mesh network, and the like. In particular, FIG. 3 shows a diagram 300 for at least a portion of a distributed content delivery network, in accordance with example embodiments of the disclosure. Specifically, diagram 300 illustrates an edge node network comprised of edge nodes connected via P2P connections. Further, the edge nodes can form a P2P network, with direct connections between nodes that are in geographical proximity with one another.

More specifically, nodes in FIG. 3 are labeled as "edge nodes." An "edge node" or "edge cacher" as disclosed herein can refer to a dedicated type of node that supports the relaying and propagation of content (e.g., streaming video, audio, software, data files, combinations thereof, and the like). An edge cacher may run on any suitable device including, but not limited to, desktops, mobile devices, smart TVs, game consoles, and server machines. In some embodiments, an edge cacher can serve to partition a portion of local storage for caching high-demand data files such as live video streams, while content types such as software patches or other updates are often stored on the local hard drive. That is, an edge cacher may interact with a machine's data storage to implement two local cache layers, a local memory and a local hard drive.

Furthermore, in the present disclosure, "viewer" nodes refer to general end user clients that receive data from a peer cacher node. A viewer node may further consume the delivered data. In some embodiments, a peer node in the THETA network may be configured to function as both an edge cacher and a viewer node at substantially the same or different times.

Stream Advertisement and Discovery

Figure 4:
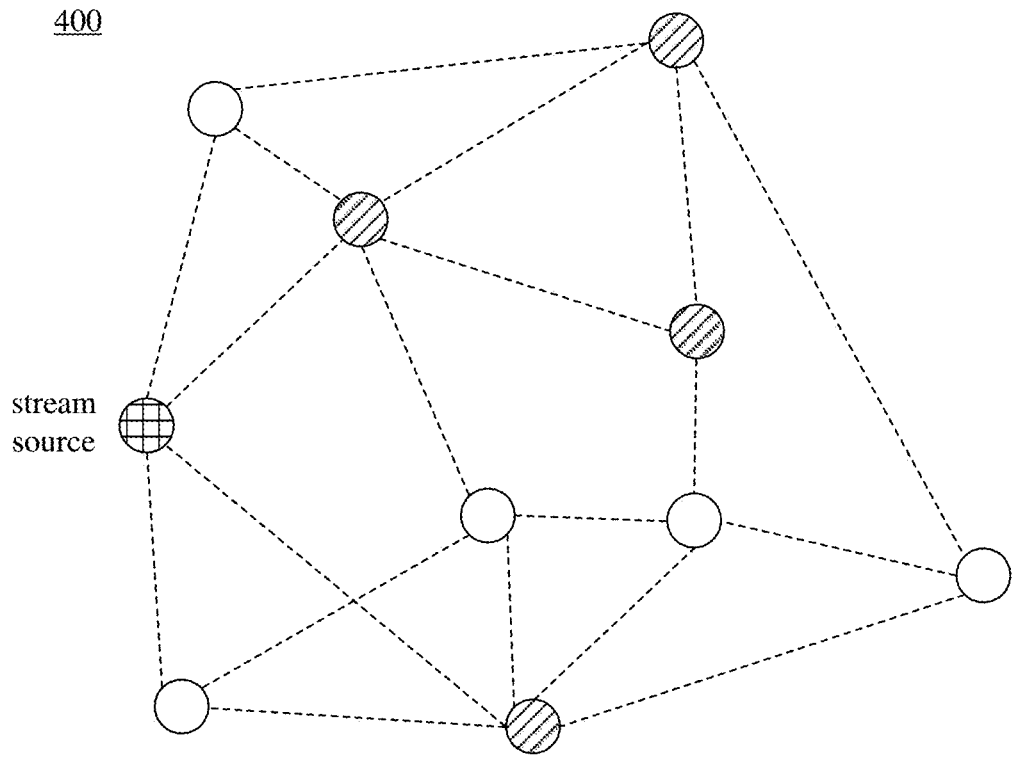
FIG. 4 shows a diagram illustrating at least one technique associated with the distribution of data on the distributed content delivery network, in accordance with example embodiments of the disclosure.
Figure 4:
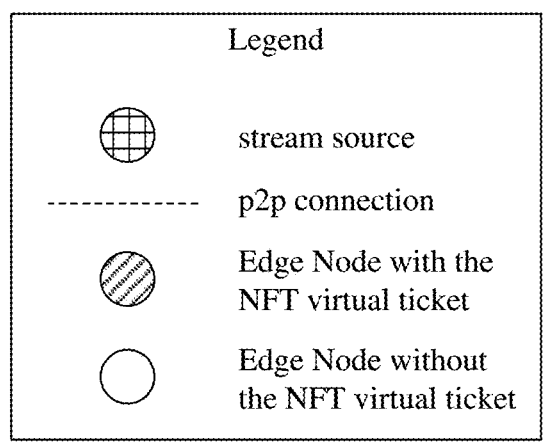

FIG. 4 shows a diagram 400 illustrating at least one technique associated with the distribution of content on a distributed content delivery network, in accordance with example embodiments of the disclosure. In particular, diagram 400 represents a technique by which the disclosed systems can provide a stream advertisement and discovery process. Specifically, in one embodiment, a "stream source" (e.g., a given node on the network), "source cacher node," or "source node" can send out an indication or notification (e.g., a message) of the stream source's intent to stream over the P2P network through a publish-subscribe (pub-sub) method in order to advertise the stream source's stream ahead of time. In one embodiment, a message may include any data or information that may be transported from one node to another node on the network. Additionally, messages may be modified, altered, or otherwise changed to comprise encrypted or anonymized information. Further, the stream source can also publish a smart contact on a corresponding blockchain (e.g., the THETA blockchain). As used herein, a smart contract can refer to a self-executing contract or self-enforcing agreement in the form of computer programming codes/instructions that can be managed by/stored on a blockchain (e.g., the THETA blockchain). The smart contract can be automatically executed when predetermined or preexisting terms and conditions are met, or when an agreement between participating parties (e.g., the nodes on the network) are reached (confirmed via any suitable means).

In some embodiments, the publishing of a smart contract can allow interested viewers and corresponding nodes to purchase a token (e.g., an NFT that can correspond to a virtual ticket) for the stream using a corresponding cryptocurrency (e.g., THETA Fuel (TFUEL), a gas token associated with the THETA network, and/or any other suitable cryptocurrency). In some embodiments, the disclosed systems can use the pub-sub method, which may have functionality that resembles one or more subscription services similar to a subscription server used in connection with an online-enabled video platform. In another embodiment, the use of the pub-sub method can allow some nodes associated with users (e.g., viewers) to subscribe to one or more updates from other nodes associated with the users' favorite streamers/influencers that distribute content via various nodes on the P2P network.

As used herein, a "non-fungible token" (NFT) can refer to a type of digital asset. A given NFT can include its own unique information, attributes, or characteristics. An NFT may comprise permanent, unalterable metadata that describes or defines its authenticity, and is transferrable in terms of ownership between nodes of the decentralized network. However, unlike a cryptocurrency token like Bitcoin, an NFT is indivisible, and not mutually interchangeable. Thus, the NFT can be used in connection with the various described embodiments of the disclosure because of the NFT's ability to function as a proof of ownership or certificate of authentication, for example, in authenticating copyrights, digital assets, and digital and real-world identities, combinations thereof, and the like.

Accordingly, FIG. 4 shows both peer nodes that own the appropriate NFT, which gives them access to the digital content distributed over the decentralized network, as well as those peer nodes that do not own the NFT, and are therefore denied access to the protected digital content (see legend). As described next, peer nodes that own the appropriate NFT, and have authenticated themselves as owning the appropriate NFT, are given access to the data key to decrypt the encrypted digital content transmitted over the decentralized network, while those that do not own the appropriate NFT are denied access to the data keys to decrypt the encrypted content.

Encrypted Video Stream Delivery

Figure 5:
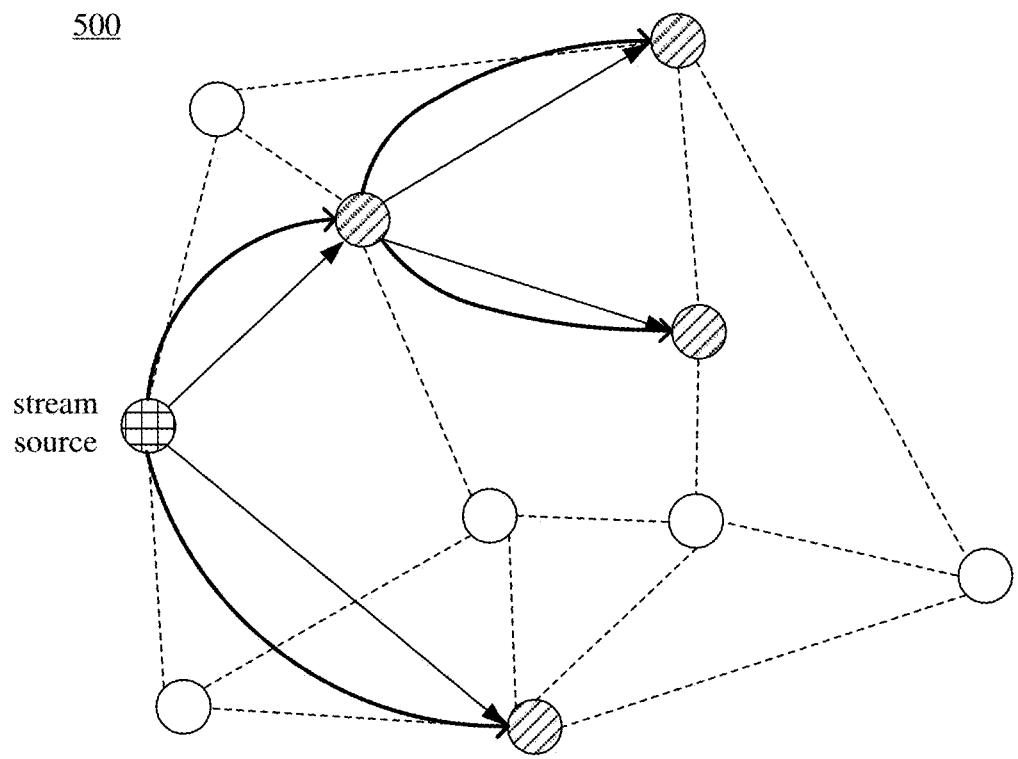
FIG. 5 shows a diagram illustrating at least one example technique for encrypted video stream delivery, in accordance with example embodiments of the disclosure.
Figure 5:
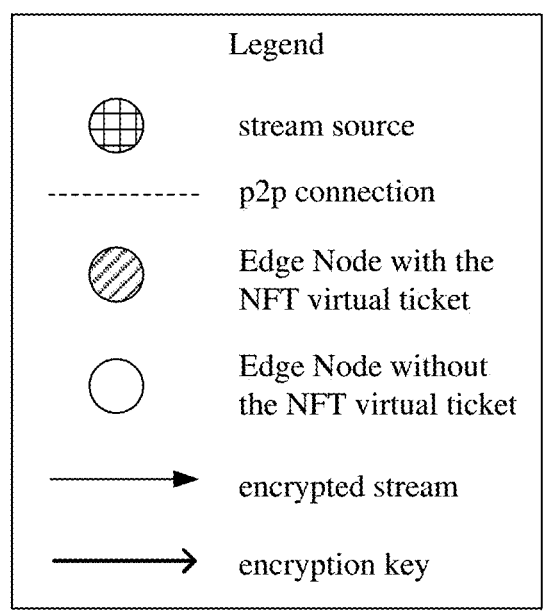

FIG. 5 shows a diagram 500 illustrating at least one example technique for encrypted video stream delivery in order to enable the DRM management aspects described variously herein, in accordance with example embodiments of the disclosure. In particular, diagram 500 illustrates an example configuration in which a streaming source node or source cacher node can be configured to generate an encrypted data stream and a corresponding data encryption key. Further, the disclosed systems can be configured, in some embodiments, such that when a given streaming session starts, the source node can push the encrypted data stream and the encryption keys to a sub-network formed by nodes that have purchased a token (e.g., an NFT-based virtual ticket) for that content. In this manner, the source node only shares the encrypted stream and encryption keys with authorized nodes (e.g., nodes that satisfy a DRM stipulation). Nodes that seek to pirate the streaming content would be prevented from viewing the content because it is encrypted, and the pirating nodes do not have the corresponding encryption key to decrypt the content for viewing.

In another embodiment, for streaming applications, a source edge cacher node can produce a data stream and generate a corresponding seed; further, the disclosed systems can derive a symmetric key from the seed. In some embodiments, when the source edge cacher node communicates with a decentralized peer viewer node, the source edge cacher can transmit the symmetric key to the peer viewer node. When the peer viewer node becomes eligible as a result of having a corresponding NFT, the peer viewer node can receive the encrypted data from the source edge cacher node through an encrypted channel. While the data key is described in some embodiments herein as being symmetric, alternative aspects contemplate using an asymmetric encryption key. (Also, as noted above, the disclosed systems may use two different types of keys, a transaction key pair for signing blockchain transactions (such as authenticating ownership of the NFT), and another data key for encrypting and decrypting a data stream between nodes for DRM)

Incentivizing Edge Nodes to Relay Streams

In one aspect, the disclosed systems may incentivize edge nodes to relay data streams to other nodes, in accordance with example embodiments of the disclosure. In particular, the disclosed systems may incentivize one or more edge nodes to help relay a given data stream that is being streamed by a source node. This can be performed, for example, to reduce the likelihood that at least a portion of the nodes in the P2P network become imbalanced consumers of content without providing a corresponding relay/upload of content (e.g., serving as so-called leachers of content). In some embodiments, when the nodes associated with users (e.g., viewer nodes) purchase tokens (e.g., the NFT virtual tickets) using cryptocurrency (e.g., TFUEL), the tokens (e.g., TFUEL purchased tokens) can be locked into a reward pool by a smart contract running on the decentralized network. Accordingly, in one embodiment, during a live stream session, the disclosed systems can release the locked tokens (e.g., TFUEL tokens) over a predetermined duration at a predetermined rate as specified by the smart contract, such that the nodes associated with users (e.g., the viewers) can pay nodes serving as upstream relayers (e.g., relay nodes) of content.

In various embodiments, the source cacher node can cause a smart contract to run when viewer node communicates (e.g., transfers data to or from) the underlying blockchain. In some aspects, after the viewer node purchases an NFT, the source node can record relevant information to the blockchain (e.g., that a given user has possession of the NFT). Further, when the viewer node requests a data key from a source cacher node, the source cacher node can query the blockchain to determine ownership of the NFT by the viewer node. If it is determined that the viewer node has the NFT, then the source cacher node can provide a decryption key; if not, the source cacher node can ignore the request for the key.

Rewarding the Streamer/Content Provider

In one aspect, the disclosed systems may reward given nodes that serve as a stream/content provider, in accordance with example embodiments of the disclosure. In particular, the disclosed systems may enable the blockchain (e.g., THETA blockchain) to provide a so-called native "split contract" which can split on-chain cryptocurrency-based (e.g., TFUEL-based) rewards, incentives, or payments to nodes associated with different parties according to a predetermined ratio. For example, when a given streaming node advertises a particular stream, the streaming node can determine to set a given split (e.g., a 40/60 split) such that a given percentage (e.g., 40%) of the cryptocurrency-based (e.g., TFUEL-based) reward is applied to the streaming node during a livestream session, while the remaining percentage (e.g., 60%) of the cryptocurrency-based reward is applied to the corresponding upstream relaying node. In this manner, the disclosed systems can serve to differentially split rewards (e.g., cryptocurrency) among nodes that serve different functions on the blockchain.

Incorporating the Blockchain Guardian Nodes

Figure 6:
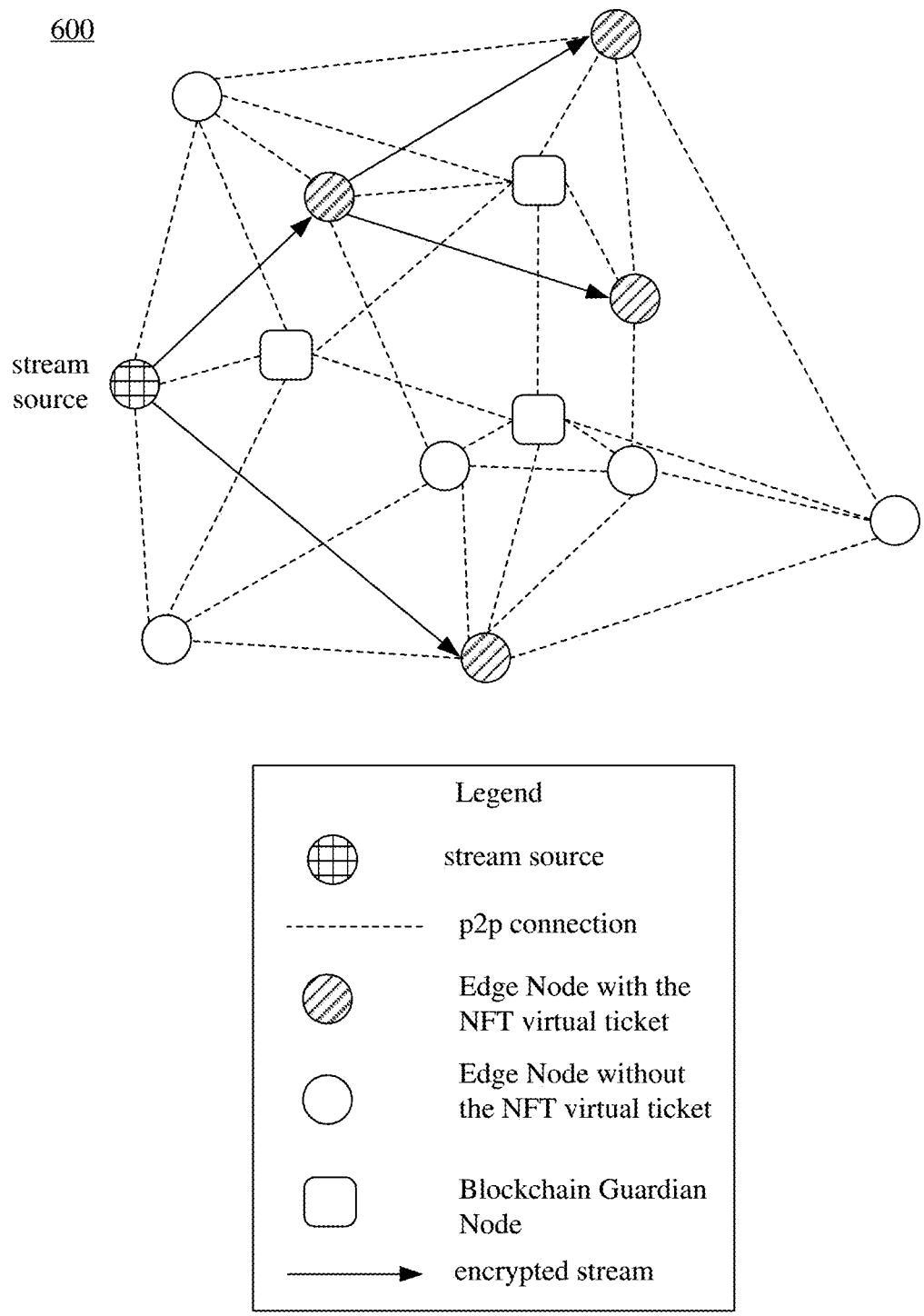
FIG. 6 shows a diagram illustrating at least one example technique for incorporating blockchain guardian nodes into the distributed content delivery network, in accordance with example embodiments of the disclosure.

FIG. 6 shows a diagram 600 illustrating at least one example technique for incorporating blockchain-based guardian nodes into the content distribution network, in accordance with example embodiments of the disclosure. In some embodiments, an edge node can query the THETA blockchain to determine whether a given node, such as a downstream node, actually holds a token (e.g., an NFT). To make this determination, the edge node can generate a randomized nonce and send the randomized nonce to a downstream node to sign in order to provide proof of the downstream node's address. The nonce can include a random or pseudo-random number issued in an authentication protocol for verification purposes described above. Accordingly, the edge node can query the blockchain with the address obtained from the downstream node to determine whether the downstream node holds a given token, such as an NFT. To reduced potential large number of queries to the blockchain in this setup, guardian nodes disclosed in more detail below may be utilized.

FIG. 6 illustrates an example technique for incorporating the blockchain guardian nodes, in accordance with example embodiments of the disclosure. In some embodiments, the disclosed systems and corresponding networks (e.g., THETA network) can include protocols (e.g., a Byzantine Fault Tolerant (BFT) protocol) to support thousands or more blockchain guardian nodes. Such guardian nodes serve to finalize blocks of transactions. Further, guardian nodes seal blocks and act as a check on malicious or otherwise non-functional nodes. Guardian nodes can further play a role to protect the security of the THETA blockchain as they form a second layer defense against potential malicious attackers and examine the THETA blockchain and try to reach consensus on finalized checkpoints. Further, as shown, the guardian nodes can connect with the edge nodes through the P2P network. This way, a given guardian node may need to handle queries from a handful of edge nodes, allowing for the system to scale. In terms of implementation, the edge nodes and the guardian nodes can use the same SDK and/or library (e.g., the same P2P-based SDK/library) so as to facilitate the formation of a P2P network.

More specifically, in some embodiments, the THETA network employs a multi-level BFT consensus mechanism to allow thousands of nodes to participate in a consensus process while still supporting very high blockchain transaction throughput, for example, in the range of 1,000+ transactions per second. Data streaming applications typically require fast consensus. For bandwidth sharing rewards, users who contribute redundant bandwidth typically want the payment to be confirmed before sending the next data segment. To minimize blockchain transaction confirmation delays, the THETA protocol uses a small set of nodes to form a validator committee, producing a chain of blocks as fast as possible using a practical BFT (PBFT)-like process. With a sufficient number of validators (such as 10 to 20 nodes), the validator committee may produce blocks at a fast speed, while still retaining a high degree of difficulty to prevent an adversary from compromising the integrity of the blockchain. A blockchain transaction is "committed" once it is included in a new block. To be eligible to join the validator committee, a node may lock up a certain amount of stake for a period of time. This is known as the Proof-of-Stake Consensus. The locked stake could be slashed if malicious behavior is detected. The blocks that the committee reaches consensus on are called settled blocks, and the process by which they produce a chain of blocks is called the block settlement process.

The term "transaction" in the present disclosure refers to an exchange or interaction between two entities. For example, in some embodiments, a transaction may include an exchange or interaction between two nodes on a network. In some embodiments, a transaction may refer to a transfer of value between two users (e.g., individuals or entities) associated with the nodes of the network. A transaction may involve the exchange of monetary funds (e.g., digital currency), or the exchange of content between two or more nodes. In other embodiments, a transaction may be a non-financial transaction, such as exchanging of data or information between two entities, such as the transfer of data or information between nodes across a communications channel. Examples of non-financial transactions may include transactions for verifying an identity of a node and/or rights and restrictions associated with a node. (In some embodiments of the present invention, transactions occur on the blockchain and require a transaction key, as mentioned above.)

Guardian nodes, which function as "consensus participants," may validate and finalize the chain generated by a validator committee at checkpoint blocks. The guardian network is a super set of the validator committee, where a validator is also a guardian. With a certain amount of token lockup for a period of time, any node in the network may instantly become a guardian. The guardians may download and examine the chain of blocks generated by the validator committee and try to reach consensus on the checkpoints. "Finalization" refers to convincing each honest guardian that more than a certain portion (e.g., ⅔) of all the other guardians see the same chain of blocks. Blocks that the guardian nodes have reached consensus on are called finalized blocks, and the process by which they finalize the chain of blocks is called the block finalization process. Checkpoint blocks are a selected subset of blocks that satisfy a given set of conditions, for example, whose height is a multiple of some integer. This "leapfrogging" finalization strategy leverages the immutability characteristic of the blockchain data structure, where as long as two guardian nodes agree on the output of a hash function (i.e., a hash) associated with a block, with a probability above a given threshold, the two guardian nodes will have exactly the same copy of the entire blockchain up to that block. In one embodiment, a hash function may refer to a mathematical algorithm that may map an arbitrarily large amount of data into a fixed-length size. In one embodiment, a given hash can result from the same data, but modifying the data (e.g., changing a bit of the data) may change the hash. The values returned by the hash function can be referred to as a hash. The validator/guardian division provides multiple levels of security guarantee. The validator committee provides a first level of consensus and the guardian pool forms a second line of defense. With thousands of nodes, it is substantially more difficult to compromise the integrity of the network, and thus provides a much higher level of security. This consensus mechanism achieves a good balance among transaction throughput, consistency, and level of decentralization.

Other Embodiments

In some embodiments, the disclosed systems can be configured to enable both stream relaying and viewing functionalities by the nodes of the network. For example, a situation may arise in which a user (e.g., a user associated with a first node of the P2P network) that has purchased a token (e.g., a virtual ticket) and is not connected directly to other users (e.g., other users associated with additional nodes of the P2P network that are connected via one edge) on the P2P network. In other examples, a given node may be configured to relay a given stream without viewing the stream at the node itself. Accordingly, the disclosed systems can be configured to create different tokens (e.g., NFT-based tokens) for different functions (e.g., for viewing and for relaying). Further, the disclosed systems can be configured to sell the tokens for different prices. One advantage of such an approach can include a better user experience, for example, since more nodes can relay the streams. Further, such approaches can afford more opportunities for more nodes to earn bandwidth by sharing rewards between nodes.

In some embodiments, the disclosed systems can be configured to handle one or more streaming events, that is, events associated with streaming. Streaming can include multimedia that is constantly received by and presented to an end-user associated with a given node on the network while being delivered by a provider (e.g., another node on the network). Through streaming, a given receiving node can start playing digital content before the entire file has been transmitted by the source node. For example, some streaming events that occur via the nodes of the P2P network can include more time-sensitive events such as a "stream starts" event; accordingly, such time-sensitive events may need to be sent to the subscribers of the P2P network (e.g., subscribed nodes) in a relatively rapid manner. In another embodiment, such events may be propagated among the nodes using any suitable protocol, such as a gossip protocol or any other suitable classes of networking protocols. Non-limiting examples of protocol classes can include virtual synchrony, distributed state machines, Paxos algorithm, database transactions, and the like. Each class can include tens or even hundreds of protocols, differing in their details and performance properties. Accordingly, such streaming events may not necessarily need to be recorded on the blockchain in real-time. In one embodiment, financial transactions such as bandwidth reward or token (e.g., NFT) purchases may need consensus among at least a portion of the nodes of the network. In another embodiment, such transactions may not need to be settled on the blockchain immediately (e.g., faster than a predetermined time period) because the off-chain payment channel may already offer one or more settlement guarantees.

In some embodiments, the disclosed systems can be configured to operate in connection with a protocol to enable an online store-like blockchain-powered commerce with affiliate program. For example, the disclosed systems can be configured to permit the token (e.g., the NFT virtual ticket) to be used as an affiliation code since the token can be tied to a streamer/content producer.

Exemplary System Architecture

Figure 7:
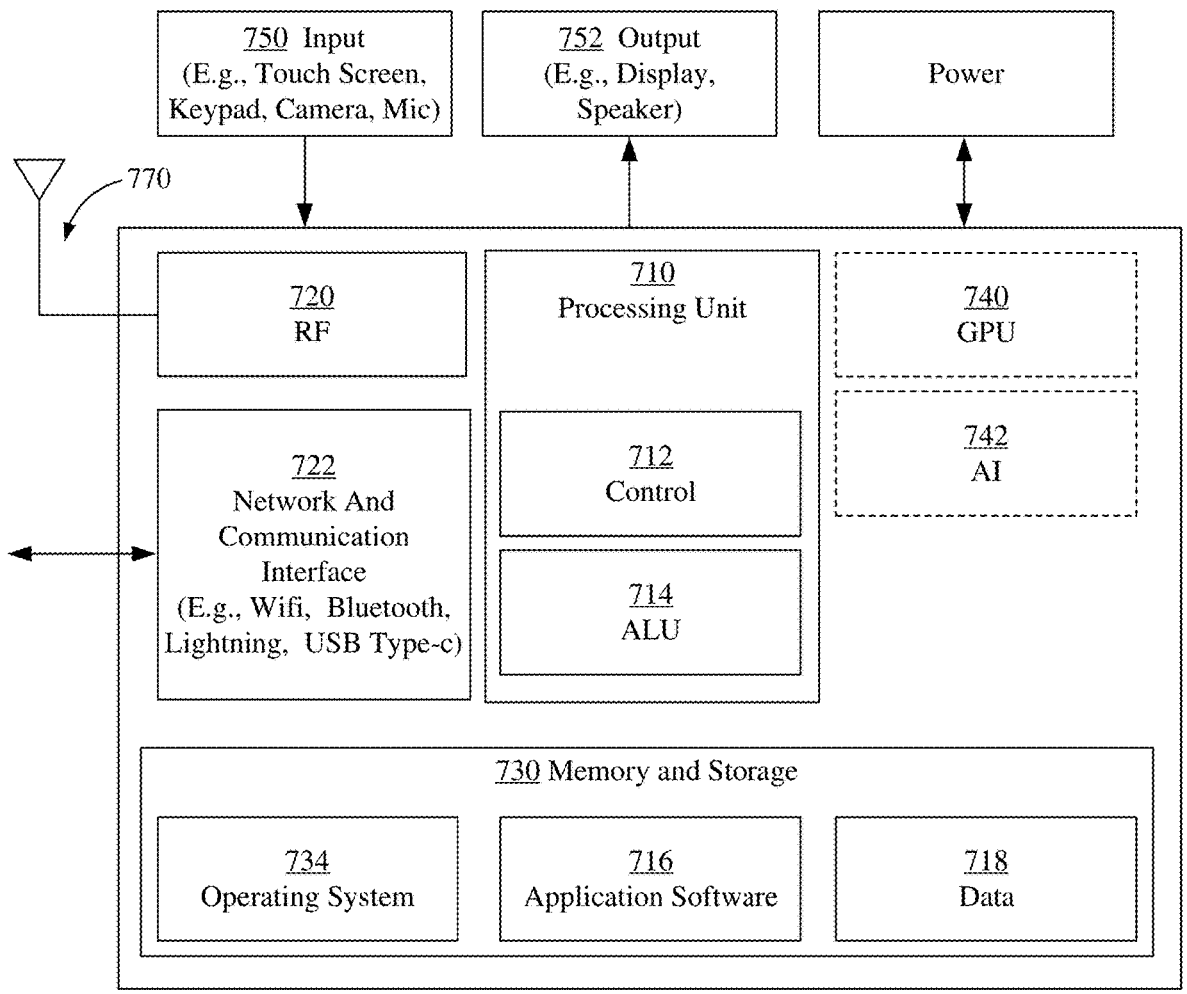
FIG. 7 is an exemplary schematic diagram of a user computing entity for implementing a viewer or cacher node, in accordance with example embodiments of the disclosure.
Figure 8:
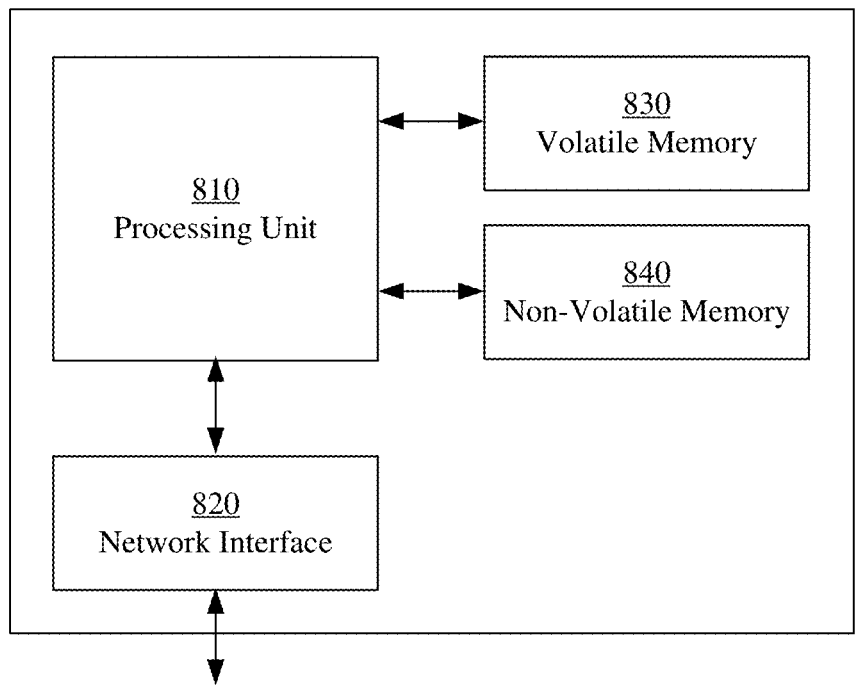
FIG. 8 is an exemplary schematic diagram of a management computing entity for implementing a server, in accordance with example embodiments of the disclosure.

An exemplary embodiment of the present disclosure may include one or more end user computing entities 700, one or more networks, and one or more CDN, tracker server, payment server, or other management computing entities 800, as shown in FIGS. 7 and 8. Each of these components, entities, devices, systems, and similar words used herein interchangeably may be in direct or indirect communication with, for example, one another over the same or different wired or wireless networks. Additionally, while FIGS. 7 and 8 illustrate the various system entities as separate, stand-alone entities, the various embodiments are not limited to this particular architecture.

Exemplary User Computing Entity

FIG. 7 is an exemplary schematic diagram of an end user computing device for implementing any suitable node on the network such as a viewer node or a cacher node, according to exemplary embodiments of the present invention. An end user computing device 700 capable of viewing or caching streamed video includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a content server, tracker, or payment server may be implemented according to the exemplary schematic diagram shown in FIG. 8, possibly in the cloud, and possibly with logically or physically distributed architectures.

As shown in FIG. 7, user computing entity 700 may include an antenna 770, a radio transceiver 720, and a processing unit 710 that provides signals to and receives signals from the transceiver. The signals provided to and received from the transceiver may include signaling information in accordance with air interface standards of applicable wireless systems. In this regard, user computing entity 700 may be capable of operating with one or more air interface standards, communication protocols, modulation types, and access types. More particularly, user computing entity 700 may operate in accordance with any of a number of wireless communication standards and protocols. In some embodiments, user computing entity 700 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 700 may operate in accordance with multiple wired communication standards and protocols, via a network and communication interface 722.

Via these communication standards and protocols, user computing entity 700 can communicate with various other computing entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). User computing entity 700 can also download changes, add-ons, and updates, for instance, to its firmware, software (e.g., including executable instructions, applications, program modules), and operating system.

In some implementations, processing unit 710 may be embodied in several different ways. For example, processing unit 710 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 710 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 710 may be configured for a particular use or configured to execute instructions stored in volatile or non-volatile media or otherwise accessible to the processing unit. As such, whether configured by hardware or computer program products, or by a combination thereof, processing unit 710 may be capable of performing steps or operations according to embodiments of the present invention when configured accordingly.

In some embodiments, processing unit 710 may comprise a control unit 712 and a dedicated arithmetic logic unit 714 (ALU) to perform arithmetic and logic operations. In some embodiments, user computing entity 700 may optionally comprise a graphics processing unit 740 (GPU) for specialized image and video rendering tasks, and/or an artificial intelligence (AI) accelerator 742, specialized for applications including artificial neural networks, machine vision, and machine learning. In some embodiments, processing unit 710 may be coupled with GPU 740 and/or AI accelerator 742 to distribute and coordinate processing tasks.

In some embodiments, user computing entity 700 may include a user interface, comprising an input interface 750 and an output interface 752, each coupled to processing unit 710. User input interface 750 may comprise any of a number of devices or interfaces allowing the user computing entity 700 to receive data, such as a keypad (hard or soft), a touch display, a mic for voice/speech, and a camera for motion or posture interfaces. User output interface 752 may comprise any of a number of devices or interfaces allowing user computing entity 700 to provide content and information to a user, such as through a touch display, or a speaker for audio outputs. In some embodiments, output interface 752 may connect user computing entity 700 to an external loudspeaker or projector, for audio or visual output.

User computing entity 700 may also include volatile and/or non-volatile storage or memory 730, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 734, application software 716, data 718, databases, database instances, database management systems, programs, program modules, SDKs, scripts, source code, object code, byte code, compiled code, interpreted code, machine code, executable instructions, and/or the like to implement the functions of user computing entity 700. As indicated, this may include a user application that is resident on the entity or accessible through a browser or other user interface for communicating with a management computing entity and/or various other computing entities.

In some embodiments, user computing entity 700 may include location determining aspects, devices, modules, functionalities, and/or similar words used herein interchangeably. For example, user computing entity 700 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 700 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any P2P protocols including BitTorrent, or that provided by the THETA data delivery network. In some embodiments, the user computing devices may use a network interface such as 722 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 8 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 8 is an exemplary schematic diagram of a management computing entity 800, such as a CDN or tracker server or a designated node of the network that implements similar functionality as a CDN or a tracker server or other related management functions, for implementing the THETA network, according to exemplary embodiments of the present invention. The terms computing entity, computer, entity, device, system, and/or similar words used herein interchangeably are explained in detail with reference to user computing entity 700.

As indicated, in one embodiment, management computing entity 800 may include one or more network or communications interface 820 for communicating with various computing entities, such as by communicating data, content, information, and/or similar terms used herein interchangeably that can be transmitted, received, operated on, processed, displayed, stored, and/or the like. For instance, management computing entity 800 may communicate with user computing device 700 and/or a variety of other computing entities. Network or communications interface 820 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 800 may be configured to communicate via wireless external communication networks using any of a variety of standards and protocols as discussed with reference to user computing device 700.

As shown in FIG. 8, in one embodiment, management computing entity 800 may include or be in communication with one or more processing unit 810 (also referred to as processors, processing circuitry, processing element, and/or similar terms used herein interchangeably) that communicate with other elements within the management computing entity 800. As will be understood, processing unit 810 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 810 may be configured for a particular use or configured to execute instructions stored in volatile or non-volatile media 830 and 840. As such, whether configured by hardware or computer program products, or by a combination thereof, processing unit 810 may be capable of performing steps or operations according to embodiments of the present disclosure when configured accordingly.

Although not shown explicitly, management computing entity 800 may include or be in communication with one or more input elements, such as a keyboard, a mouse, a touch screen/display, a camera for motion and movement input, a mic for audio input, a joystick, and/or the like. Management computing entity 800 may also include or be in communication with one or more output elements such as speaker, screen/display, and/or the like.

In various embodiments, one or more of the components of management computing entity 800 may be located remotely from other management computing entity components, such as in a distributed system or in the cloud. Furthermore, one or more of the components may be combined and additional components performing functions described herein may be included in the management computing entity 800.

Exemplary Process Flowchart

Figure 9:
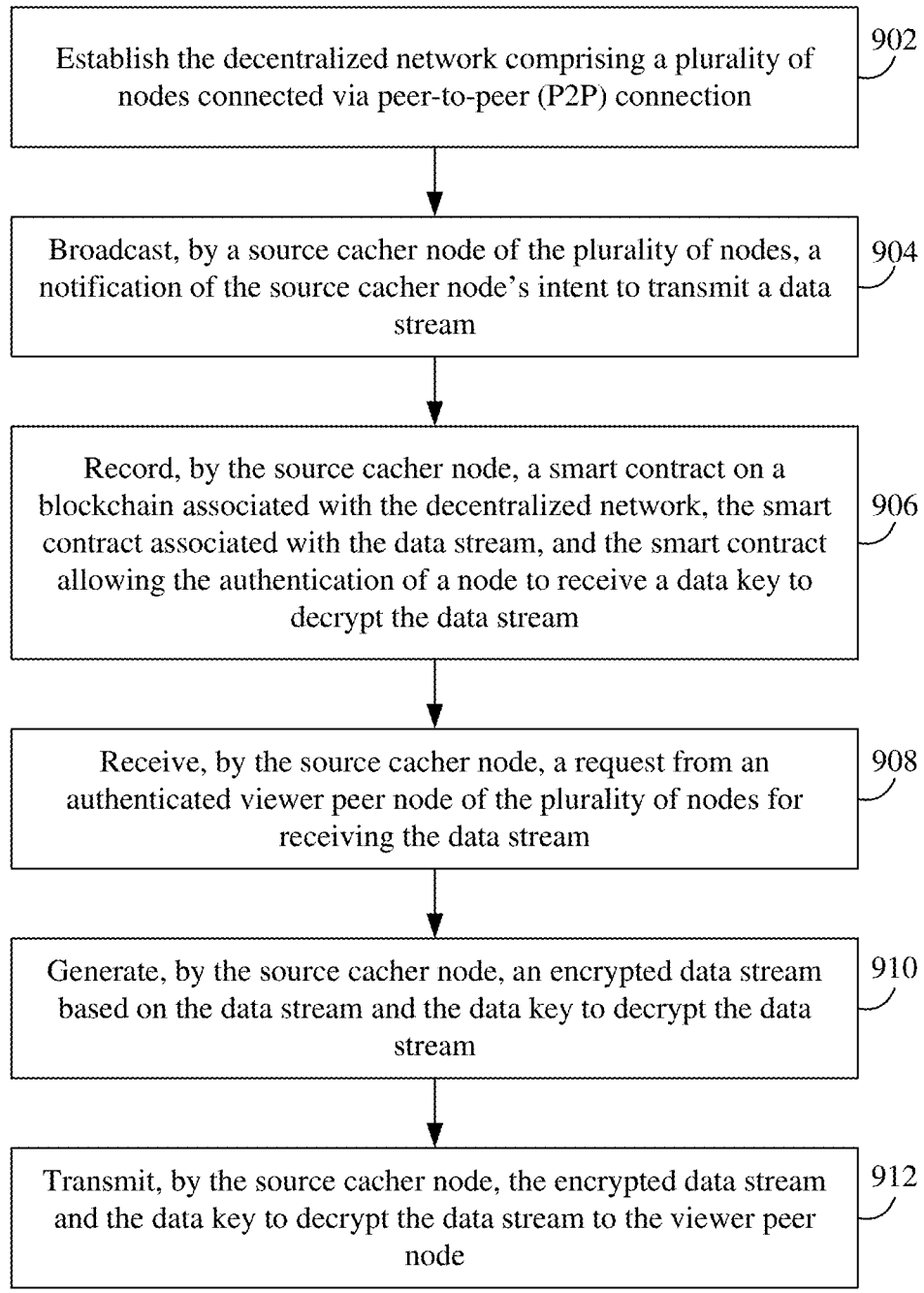
FIG. 9 is an illustration of an exemplary flow chart illustrating example operations associated with the disclosed systems, in accordance with example embodiments of the disclosure.

FIG. 9 is an illustration of an exemplary flow chart 900 illustrating example operations associated with the disclosed systems, in accordance with example embodiments of the disclosure. At block 902, the disclosed systems can establish the decentralized network comprising a plurality of nodes connected via peer-to-peer (P2P) connection.

At block 904, the disclosed systems can broadcast, by a source cacher node of the plurality of nodes, a notification of the source cacher node's intent to transmit a data stream.

In various embodiments, the notification can be transmitted by a corresponding message that includes particular information that signifies to the receiving nodes that the source cacher node will transmit a data stream with particular features (e.g., at a given time, at a given rate, at a given bandwidth, combinations thereof, and the like).

At block 906, the disclosed systems can record, by the source cacher node, a smart contract on a blockchain associated with the decentralized network, the smart contract associated with the data stream, and the smart contract allowing the authentication of a node to receive a data key to decrypt the data stream. In some aspects, the smart contract can include a computer program or a transaction protocol which is intended to automatically execute, control or document relevant events and actions according to the terms of a contract or an agreement.

At block 908, the disclosed systems can receive, by the source cacher node, a request from an authenticated viewer peer node of the plurality of nodes for receiving the data stream. At block 910, the disclosed systems can generate, by the source cacher node, an encrypted data stream based on the data stream and the data key to decrypt the data stream. In various embodiments, the disclosed systems can use any suitable encryption technique including symmetric and asymmetric encryption. In some embodiments, the disclosed systems can use a symmetric key system, where the same key is used for encrypting and decrypting data. (In other embodiments, the disclosed systems can also use an asymmetric or public key system, where the encryption key is publicly available, but only authorized nodes having the private decryption key can decrypt the data stream.) At block 912, the disclosed systems can transmit, by the source cacher node, the encrypted data stream and the data key to decrypt the data stream to the authenticated viewer peer node.

In one embodiment, the transmission of the encrypted data stream comprises a live stream, where the transmission of the encrypted data stream is relayed through an authenticated edge cacher node. Moreover, the computer-implemented method may further include locking, via the smart contract, a reward from the authenticated viewer peer node; and releasing, via the smart contract and to the source cacher node and the authenticated edge cacher node, respective portions of the reward over a predetermined time interval. A reward may include a digital asset designed to work as a medium of exchange where ownership records are stored in a ledger existing in a form of computerized database using strong cryptography to secure transaction records, to control the creation of additional currency, and to verify the transfer of ownership. In various embodiments, the disclosed systems can trigger the smart contract on the blockchain, for example, when performing a read operation by a viewer node.

In another embodiment, the authenticated edge cacher node can determine at least a first portion of the reward from the viewer peer node and at least a second portion of the reward, where the first portion is released to the authenticated edge cacher node, and where the second portion is released to the source cacher node.

In one embodiment, the source cacher node can generate and transmit, via the blockchain, a random nonce to the viewer peer node and can receive, from the viewer peer node, a signed nonce including the viewer peer node's address, and the source cacher node can query the blockchain with the viewer peer node's address and determines, based on a result of the query, whether the viewer peer node holds the NFT as a proof of authenticity.

In another embodiment, the decentralized network can include at least one guardian node, the guardian node connected to at least the source cacher node, and where the guardian node can perform at least one computation associated with the querying of the blockchain by the source cacher node. In one embodiment, the blockchain can utilize a validator committee of mining nodes to mine new blocks in a block settlement process; and the blockchain can further utilize the at least one guardian node to validate the blockchain at checkpoint blocks, in a block finalization process, and the checkpoint blocks can include a subset of blocks in the blockchain. In another embodiment, the at least one guardian node can be within a predetermined geographical proximity of the source cacher node.

In some embodiments, at least one of the encrypted data stream and the data key to decrypt the data stream can be associated with a digital rights management protocol.

In one embodiment, the broadcasting the notification of the source cacher node's intent to transmit the data stream can further include using a publish-subscribe technique to advertise the notification to the viewer peer node, where the viewer peer node can be subscribed to notifications from the source cacher node.

Other embodiments include the corresponding methods and processes utilized by the authenticated viewer peer nodes to request and download content they are entitled to, as would be recognized by one of ordinary skill in the art.

In one aspect, one embodiment is a computer-implemented method utilized by a viewer peer node for implementing digital rights management (DRM) within a decentralized network, comprising receiving a notification of a source cacher node's intent to transmit a data stream, where the decentralized network comprises a plurality of peer nodes connected via peer-to-peer (P2P) connections; interacting with a smart contract on a blockchain associated with the decentralized network to obtain an authentication to receive a data key to decrypt the data stream, the smart contract associated with the data stream, and the smart contract allowing the authentication of the viewer peer by the viewer node's ownership of a non-fungible token (NFT); transmitting a request to the source cacher node to receive the data stream; receiving an encrypted data stream based on the data stream and the data key to decrypt the data stream; and decrypting the encrypted data stream using the data key.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software). Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method utilized by a source cacher node for implementing decentralized digital rights management (DRM) within a decentralized network, comprising:
    broadcasting, to one or more viewer peer nodes in the decentralized network, a notification of the source cacher node's intent to transmit a data stream, wherein the decentralized network comprises a plurality of peer nodes connected via peer-to-peer (P2P) connections, wherein the data stream comprises data streamed from the source cacher node to a viewer peer node via the peer-to-peer (P2P) connections;
    recording a smart contract on a blockchain associated with the decentralized network, the smart contract associated with the data stream, and the smart contract allowing the authentication of the viewer peer node through the smart contract by an ownership of a non-fungible token (NFT) in order to receive a data key to decrypt the data stream;
    receiving a request from an authenticated viewer peer node of the one or more viewer peer nodes for receiving the data stream, wherein a reward from the authenticated viewer peer node is locked via the smart contract;
    generating an encrypted data stream based on the data stream and the data key to decrypt the data stream; and
    transmitting the encrypted data stream and the data key to decrypt the data stream to the authenticated viewer peer node, wherein the encrypted data stream and the data key to decrypt the data stream are associated with a digital rights management protocol within the decentralized network,
    wherein the transmission of the encrypted data stream is relayed through an authenticated edge cacher node, and wherein respective portions of the reward are released over a predetermined time interval, via the smart contract, to the source cacher node and the authenticated edge cacher node.

2. The computer-implemented method of claim 1, wherein the transmission of the encrypted data stream comprises a live stream.

3. The computer-implemented method of claim 2, wherein the authenticated edge cacher node determines at least a first portion of the reward from the viewer peer node and at least a second portion of the reward, wherein the first portion is released to the authenticated edge cacher node, and wherein the second portion is released to the source cacher node.

4. The computer-implemented method of claim 1,
    wherein the source cacher node generates and transmits, via the blockchain, a random nonce to the viewer peer node and receives, from the viewer peer node, a signed nonce including the viewer peer node's address, and
    wherein the source cacher node queries the blockchain with the viewer peer node's address and determines, based on a result of the query, whether the viewer peer node holds the NFT as a proof of authenticity.

5. The computer-implemented method of claim 1, wherein the decentralized network comprises at least one guardian node, the guardian node connected to at least the source cacher node, and wherein the guardian node performs at least one computation associated with the querying of the blockchain by the source cacher node.

6. The computer-implemented method of claim 5,
    wherein the blockchain utilizes a validator committee of mining nodes to mine new blocks in a block settlement process; and
    wherein the blockchain further utilizes the at least one guardian node to validate the blockchain at checkpoint blocks, in a block finalization process, and wherein the checkpoint blocks are a subset of blocks in the blockchain.

7. The computer-implemented method of claim 5, wherein the at least one guardian node is within a predetermined geographical proximity of the source cacher node.

8. The computer-implemented method of claim 1, wherein the broadcasting the notification of the source cacher node's intent to transmit the data stream comprises using a publish-subscribe technique to advertise the notification to the viewer peer node, and wherein the viewer peer node is subscribed to notifications from the source cacher node.

9. A non-transitory storage medium storing program code, the program code executable by a hardware processor, the program code when executed by the processor executes a process utilized by a source cacher node for implementing decentralized digital rights management (DRM) within a decentralized network, the program code when executed by the processor causes the processor to:
- broadcast, to one or more viewer peer nodes in the decentralized network, a notification of the source cacher node's intent to transmit a data stream, wherein the decentralized network comprises a plurality of peer nodes connected via peer-to-peer (P2P) connections, wherein the data stream comprises data streamed from the source cacher node to a viewer peer node via the peer-to-peer (P2P) connections;
- record a smart contract on a blockchain associated with the decentralized network, the smart contract associated with the data stream, and the smart contract allowing the authentication of the viewer peer node through the smart contract by an ownership of a non-fungible token (NFT) in order to receive a data key to decrypt the data stream;
- receive a request from an authenticated viewer peer node of the one or more viewer peer nodes for receiving the data stream, wherein a reward from the authenticated viewer peer node is locked via the smart contract;
- generate, an encrypted data stream based on the data stream and the data key to decrypt the data stream; and
- transmit the encrypted data stream and the data key to decrypt the data stream to the authenticated viewer peer node, wherein the encrypted data stream and the data key to decrypt the data stream are associated with a digital rights management protocol within the decentralized network,
- wherein the transmission of the encrypted data stream is relayed through an authenticated edge cacher node, and wherein respective portions of the reward are released over a predetermined time interval, via the smart contract, to the source cacher node and the authenticated edge cacher node.

10. The non-transitory storage medium of claim 9, wherein the transmission of the encrypted data stream comprises a live stream.

11. The non-transitory storage medium of claim 10, wherein the authenticated edge cacher node determines at least a first portion of the reward from the viewer peer node and at least a second portion of the reward, wherein the first portion is released to the authenticated edge cacher node, and wherein the second portion is released to the source cacher node.

12. The non-transitory storage medium of claim 9,
- wherein the source cacher node generates and transmits, via the blockchain, a random nonce to the viewer peer node and receives, from the viewer peer node, a signed nonce including the viewer peer node's address, and
- wherein the source cacher node queries the blockchain with the viewer peer node's address and determines, based on a result of the query, whether the viewer peer node holds the NFT as a proof of authenticity.

13. The non-transitory storage medium of claim 9, wherein the decentralized network comprises at least one guardian node, the guardian node connected to at least the source cacher node, and wherein the guardian node performs at least one computation associated with the querying of the blockchain by the source cacher node.

14. A system comprising a hardware processor and a non-transitory storage medium storing program code, the program code executable by the hardware processor, the program code when executed by the processor executes a process utilized by a source cacher node for implementing decentralized digital rights management (DRM) within a decentralized network, the program code when executed by the processor causes the processor to:
- broadcast, to one or more viewer peer nodes in the decentralized network, a notification of the source cacher node's intent to transmit a data stream, wherein the data stream comprises data streamed from the source cacher node to a viewer peer node via the peer-to-peer (P2P) connections;
- record a smart contract on a blockchain associated with the decentralized network, the smart contract associated with the data stream, and the smart contract allowing the authentication of the viewer peer node through the smart contract by an ownership of a non-fungible token (NFT) in order to receive a data key to decrypt the data stream;
- receive a request from an authenticated viewer peer node of the one or more viewer peer nodes for receiving the data stream, wherein a reward from the authenticated viewer peer node is locked via the smart contract;
- generate an encrypted data stream based on the data stream and the data key to decrypt the data stream; and
- transmit the encrypted data stream and the data key to decrypt the data stream to the viewer peer node, wherein the encrypted data stream and the data key to decrypt the data stream are associated with a digital rights management protocol within the decentralized network,
- wherein the transmission of the encrypted data stream is relayed through an authenticated edge cacher node, and wherein respective portions of the reward are released over a predetermined time interval, via the smart contract, to the source cacher node and the authenticated edge cacher node.

15. The system of claim 14, wherein the transmission of the encrypted data stream comprises a live stream.

16. The system of claim 15, wherein the authenticated edge cacher node determines at least a first portion of the reward from the viewer peer node and at least a second portion of the reward, wherein the first portion is released to the authenticated edge cacher node, and wherein the second portion is released to the source cacher node.

17. The system of claim 14, wherein the decentralized network comprises at least one guardian node, the guardian node connected to at least the source cacher node, and wherein the guardian node performs at least one computation associated with the querying of the blockchain by the source cacher node.

* * * * *